(12) United States Patent
Sasaki et al.

(10) Patent No.: US 6,561,248 B2
(45) Date of Patent: May 13, 2003

(54) LAMINATION SYSTEM

(75) Inventors: Naotaka Sasaki, Kiryu (JP); Kenji Sugaya, Kiryu (JP); Misao Ichikawa, Kiryu (JP); Kensuke Shoji, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/115,950

(22) Filed: Apr. 5, 2002

(65) Prior Publication Data

US 2002/0144789 A1 Oct. 10, 2002

(30) Foreign Application Priority Data

Apr. 6, 2001 (JP) .......................................... 2001-108437

(51) Int. Cl.⁷ .............................................. B32B 35/00
(52) U.S. Cl. .................... 156/521; 156/556; 156/583.1; 156/582; 156/555
(58) Field of Search ................................ 156/521, 556, 156/583.1, 582, 555

(56) References Cited

U.S. PATENT DOCUMENTS

| | | | | |
|---|---|---|---|---|
| 3,627,994 A | * | 12/1971 | Sallach et al. | ............... 235/448 |
| 4,149,925 A | * | 4/1979 | Mintz | ........................ 156/361 |
| 4,170,348 A | * | 10/1979 | Hoeink et al. | ............... 271/240 |
| 5,783,024 A | | 7/1998 | Forkert | ........................ 156/351 |
| 5,807,461 A | | 9/1998 | Hagstrom | ................... 156/361 |
| 6,165,306 A | * | 12/2000 | Rajala | ........................ 156/263 |
| 6,261,012 B1 | * | 7/2001 | Haas et al. | ................. 400/208 |
| 6,264,774 B1 | * | 7/2001 | Lenz et al. | .................... 156/64 |
| 6,279,901 B1 | * | 8/2001 | Fulmer | ........................ 271/272 |
| 6,352,095 B1 | * | 3/2002 | Fulmer | ........................ 156/387 |
| 2002/0030110 A1 | * | 3/2002 | Sakamoto et al. | .......... 235/475 |
| 2002/0134516 A1 | * | 9/2002 | Ashley et al. | .............. 156/540 |

* cited by examiner

*Primary Examiner*—Linda Gray
(74) *Attorney, Agent, or Firm*—Birch, Stewart, Kolasch & Birch, LLP

(57) ABSTRACT

A lamination system of the present invention comprises; a film transfer means for transferring a continuous film, a cutting means for cutting the film, a card transfer means for transferring an ID card, a thermocompression bonding means for laminating the film to the ID card, a card straightening means straightening the ID card bent during the thermocompression bonding, in which a spring up suppression means for suppressing a spring up of a trailing edge of the ID card leaving the thermocompression bonding means is provided.

3 Claims, 4 Drawing Sheets

LAMINATION SYSTEM

BACKGROUND OF THE INVENTION

1. Field of the Invention

The present invention concerns a lamination system for thermocompression bonding of a transparent film on a surface of an ID card on which such as a photograph of a person and personal data are printed. More specifically, the present invention concerns an improvement of the wasteless type lamination system for laminating the transparent film on the surface of the ID card, successively cutting a continuous transparent film that has been rolled in a supply roll into a predetermined length, in which a defect that occurs in a card straightening process is remedied.

2. Description of the Prior Art

Recently, ID cards of various type are being widely used. In order to protect an ID card from tampering or to improve the life of the ID card, a transparent film of about 30 microns in thickness is laminated by a thermocompression bonding on a surface of the ID card on which information data are printed. Lamination systems such as disclosed in U.S. Pat. Nos. 5,807,461 and 5,783,024 are known as systems suitable for such lamination.

In the lamination system disclosed in U.S. Pat. No. 5,807,461, a transparent film pre-cut in a predetermined shape (a patch) is mounted on a carrier (a base sheet). The carrier is provided with sensor marks (index markings) for detecting the position of the pre-cut patch on the carrier. The lamination system detects the sensor mark prior to the lamination to detect the position of the pre-cut patch, then tears the patch from the carrier and laminates the patch on the surface of the printed ID card by thermocompression bonding. Such lamination system is undesirable in view of the operation cost and the protection of environment, since the carrier is thrown away as waste material.

The above problem was solved in a lamination system disclosed in U.S. Pat. No. 5,783,024 and the system is being practically used. In this lamination system, a leading edge of a continuous transparent laminate film is drawn out from a supply roll, then transferred along a supply path, then cut in a predetermined length, then laid on a printed ID card transferred along another supply path at the convergence zone of the two supply paths, and then laminated on the surface of the ID card by thermocompression bonding using a heat roller provided at the downstream. This lamination system, called wasteless type lamination system, is advantageous since the laminate film is used after being cut in a necessary length, and accordingly, no waste carrier such as in the lamination system-disclosed in U.S. Pat. No. 5,807,461 is left.

In this thermocompression bonding process, the laminated ID card tends to be bent into a form concave toward the heat roller, since heat and pressure are applied to one side of the laminated ID card by the heat roller. Accordingly, a card straightening means, for straightening the bent laminated ID card, comprising rollers supported on an adjustment plate, is provided at the downstream of the heat roller in the lamination system.

In the lamination system such as disclosed in U.S. Pat. No. 5,783,024, lamination is practiced as follows. The continuous transparent laminate film is loaded in a form of a supply roll on a supply spindle. A leading edge of the continuous laminate film is drawn out from the supply roll and transferred along a film transfer path. The continuous laminate film of which the leading edge is drawn out is hung on a roller composing a first transfer means, then passed between two cutting blades of a cutter, then transferred thorough a second transfer means composed of rollers, and then passed under a film detection sensor.

On the other hand, the printed ID card is put into an inlet of the lamination system. Then the printed ID card is transferred along a card transfer path, and then transferred to a point of convergence, composed of a pair of rollers, at which the film transfer path and the card transfer path converge, after being positioned for registration using an detection signal detected by a card edge detection sensor.

After that, the cut laminate film is laid on the printed ID card, then the cut laminate film and the printed ID card are transferred into a place between the heat roller and a platen roller to be applied predetermined heat and pressure. As a result, a heat adhesive layer of the cut laminate film is activated and the cut laminate film is laminated on the printed ID card by thermocompression bonding. In general, the heat roller is made of an aluminum material and is treated to have a fluoro resin lining to avoid sticking of a material melted out of the printed ID card. The platen roller is made of a heat-resisting rubber material.

In the thermocompression bonding process as explained above, the laminated ID card tends to be bent into a form concave toward the heat roller, since the laminated ID card passes between the heat roller and the platen roller that differ with each other in temperature and in rigidity. Accordingly, the card straightening means for straightening the bent laminated ID card is provided at the downstream of the heat roller and the platen roller. The card straightening means comprises a pair of rollers supported by the adjustment plate. While the laminated ID card is being passed between these rollers, the transfer path of the ID card is tilted by tilting the adjustment plate, and the reverse bend to the concave bend is applied to the laminated ID card between the heat roller and the card straightening means, to straighten the bent ID card. Additionally, distance between the heat roller and the card straightening means is set so that they do not interfere with each other and that a sufficient bending moment to straighten the bent ID card is applied to the bent ID card.

In the card straightening process as explained above, the laminated ID card leaves the heat roller while being applied the bending moment to straighten the bent ID card. Accordingly, the trailing edge of the ID card is strongly pressed to the heat roller when leaving the heat roller, a portion of the ID card is melted and the melted material sticks to the surface of the heat roller, even though the roller is treated to have a fluoro resin lining. Accordingly, there is a problem that the stuck material sticks on the surface of the succeeding ID card to be laminated next.

Additionally, in case that the distance between the heat roller and the card straightening means is relatively long, there is a problem that straightening of the bent ID card is insufficient.

These problems degrade the quality of finished ID cards. Particularly, for a ID card with magnetic stripes on the back, if the straightening of the bent ID card is insufficient, reliability in "read/write" of magnetic data is degraded.

SUMMARY OF THE INVENTION

It is an object of the present invention to solve the above problems and to provide a lamination system capable of raising the quality of the laminated ID cards and capable of straightening the bent ID card in the lamination process.

To achieve the above object, a lamination system according to the present invention comprises a film transfer means for transferring along a first transfer path a continuous film with a heat adhesive layer on a surface and drawn out from a supply roll, a cutting means provided along the first transfer path for cutting the film in a predetermined length, a card transfer means for transferring an ID card along a second transfer path that converges with the first transfer path at a predetermined point of conversion, a thermocompression bonding means for laminating the film cut in the predetermined length and laid on a surface of the ID card transferred, to the ID card at the downstream of the point of conversion, a card straightening means provided at the downstream of the thermocompression bonding means for straightening the ID card laminated and bent during the thermocompression bonding, in which a spring up suppression means for suppressing a spring up of a trailing edge of the laminated ID card leaving the thermocompression bonding means is provided between the thermocompression bonding means and the card straightening means.

Further according to the present invention, the spring up suppression means comprises a rotary element freely rotative.

Alternatively, the spring up suppression means comprises a card guide member having a gap that enables the passage of the laminated ID card and the suppression of the spring up of the trailing edge of the laminated ID card.

In the lamination system according to the present invention, since the spring up suppression means for suppressing spring up of the trailing edge of the laminated ID card leaving the thermocompression bonding means is provided between the thermocompression bonding means and the card straightening means, the trailing edge of the laminated ID card is not pressed to the heat roller when the laminated ID card leaves the thermocompression bonding means. Accordingly, the trailing edge of the ID card is prevented from melting, no melted material sticks to the surface of the heat roller, and thus the surface of a successive ID card to be laminated next is prevented from being spoiled by a melted material. Further, since the straightening force for the bent ID card is maintained also in the process in which the heat applied by the heat roller is being cooled after the trailing edge of the ID card is released from the thermocompression bonding means, the straightening of the bent ID card after lamination is improved.

DETAILED DESCRIPTION OF THE INVENTION

Figure 1:
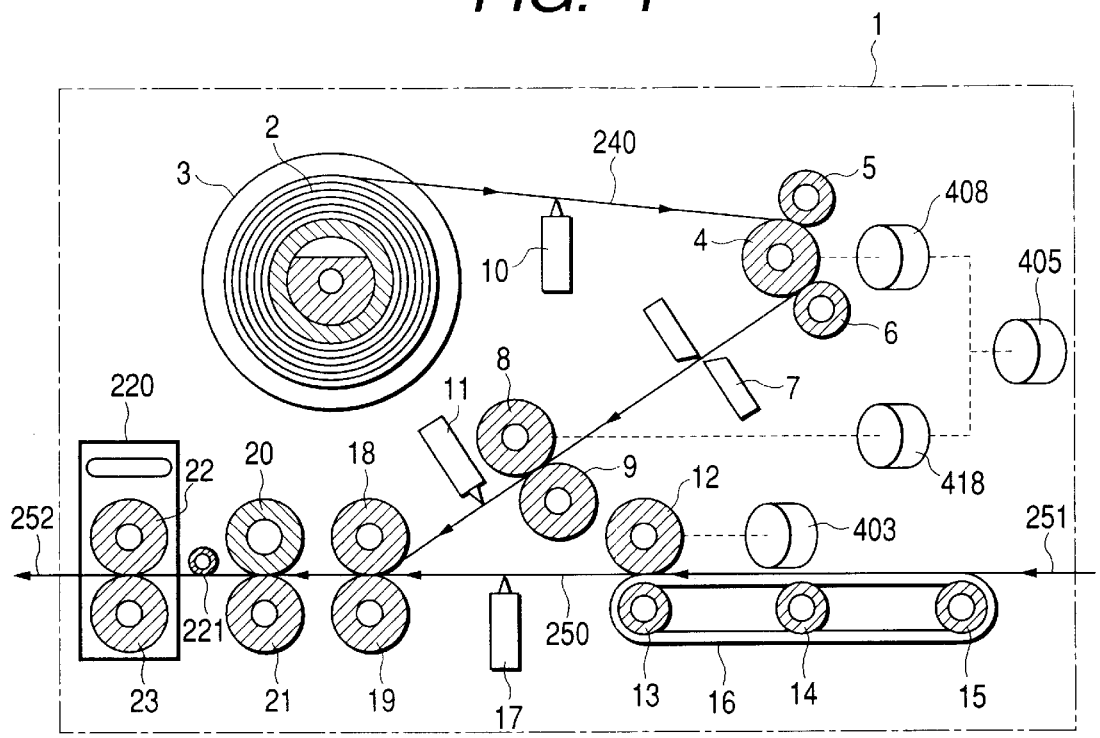
FIG. 1 is a schematic front view of a wasteless type lamination system according to the present invention.

FIG. 1 is a schematic front view of a first embodiment of the lamination system 1 according to the present invention. A transparent continuous laminate film is loaded in a form of a supply roll 2 on a supply spindle 3. A leading edge of the laminate film is drawn out from the supply roll 2 and transferred along a film transfer path 240 that is a first transfer path. A laminate film supply monitoring sensor 10 composed of an optical sensor represented by a reflective type optical sensor is provided along the film transfer path 240 and monitors the supply of the continuous laminate film. The continuous laminate film is hung on a roller 4 composing a first transfer means, then passed between two cutting blades of a cutter 7, then transferred thorough a second transfer means composed of rollers 8 and 9, and then transferred under a film detection sensor 11 composed of an optical sensor also represented by a reflective type optical sensor. The first and the second transfer means compose a film transfer means.

On the other hand, a printed ID card is put into an inlet 251 of the lamination system 1. Then, the printed ID card is transferred on a belt 16 driven by rollers 13 to 15, then transferred along a card transfer path 250, that is a second transfer path, being held by the belt 16 located on the roller 13 and a roller 12 opposing to the belt 16, and then transferred to a point of convergence, composed of a rollers 18 and 19, at which the film transfer path 240 and the card transfer path 250 converge, after being positioned for registration using a detection signal detected by a card edge detection sensor 17 composed of an optical sensor also represented by a reflective type optical sensor. The rollers 12 to 15 and the belt 16 compose a card transfer means.

Drive force of a laminate film transfer motor 405 is transmitted to the roller 4 through a laminate load electric clutch 408. The drive force is further transmitted to rollers 5 and 6 through the roller 4 and the respective gears (not illustrated). Similarly, the drive force is transmitted to a roller 8 through a laminate feed electric clutch 418, and from the roller 8 to a roller 9 through a gear (not illustrated).

In this embodiment, a stepping motor is adopted as the laminate film transfer motor 405. Since an amount of rotation of a stepping motor can be precisely and easily controlled by controlling a number of drive pulses, amounts of rotation of the roller 4 and the roller 8 can also be precisely and easily controlled. Further, by combining on/off controls of the laminate load electric clutch 408 and the laminate feed electric clutch 418 with the rotation control of the motor, transfer of the laminate film can be made minutely. A card transfer motor 403 is also provided with a card transfer system and a stepping motor is also adopted. Accordingly, transfer of a card can be minutely controlled by controlling a number of drive pulses for the card transfer motor 403. Drive force of the card transfer motor 403 is transmitted to a roller 12, and then from a drive shaft (not illustrated) of the roller 12 to rollers 13 and 18, a heat roller 20 and a roller 22 through such as gears and/or synchronous belts (not illustrated). The drive force is further transmitted from these rollers to rollers opposing to these rollers through the respective gears (not illustrated). Additionally, the laminate film transfer motor 405 can be omitted. In this case, the drive force of the card transfer motor 403 is transmitted to the rollers in the film transfer system through electric clutches. The control of the transfer of the laminate film can also be made similar to that explained above. Further, a servomotor such as a rotary encoder with a number of rotation sensor can be used as the drive source in place of the stepping motor. In this case, control of the transfer can also be made similarly to the case explained above.

Figure 2:
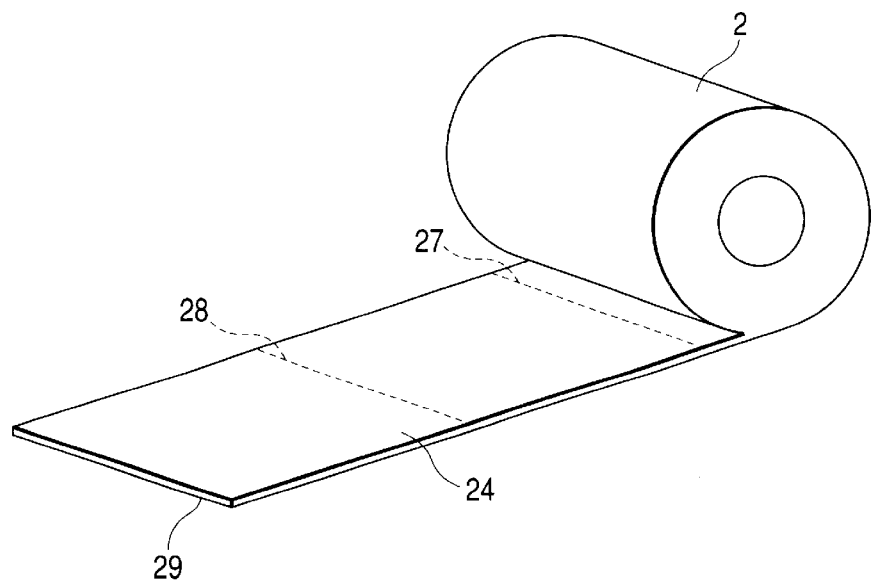
FIG. 2 is a schematic perspective view of an example of a supply roll of a laminate film suitable for use in the practice of the present invention.

FIG. 2 is a schematic perspective view of an example of a supply roll 2 of a laminate film 24 suitable for use in the practice of the present invention. As shown, the leading edge 29 of a continuous laminate film 24 is drawn out from the supply roll 2 and cut successively along a cutting line 28, a cutting line 27 and so forth by the cutter 7. The continuous laminate film 24 may be a transparent film, or may be a film treated to have a hologram surface for preventing from forgery. Accordingly, it is necessary that the surface of the laminated ID card is kept clean, and that no images other than the printed images remains on the surface.

Figure 3:
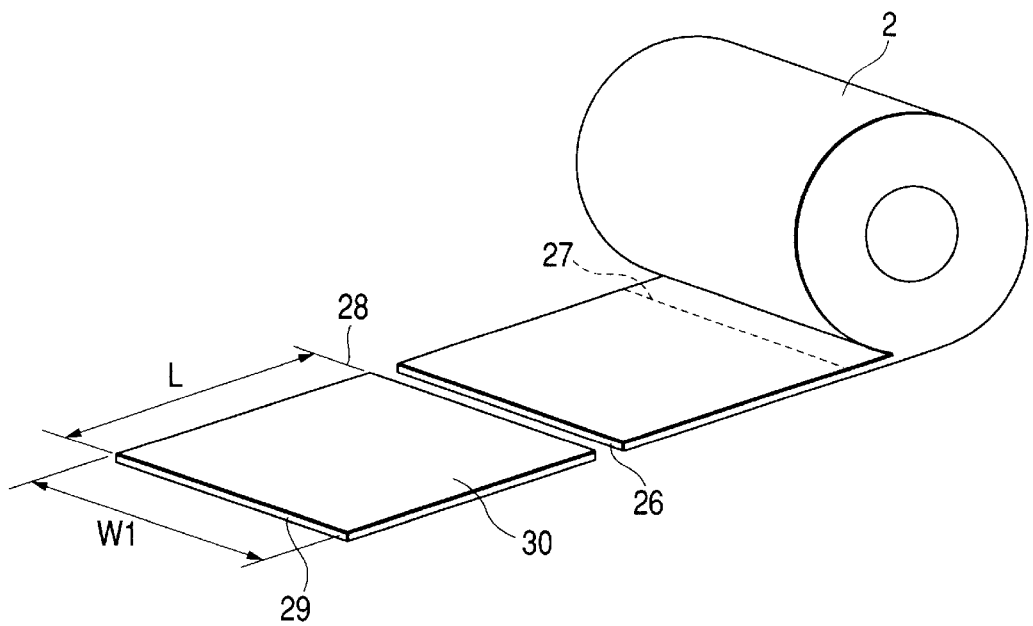
FIG. 3 is a schematic perspective view of the supply roll of the laminate film in FIG. 2 after the laminate film is cut from the supply roll.
Figure 7:
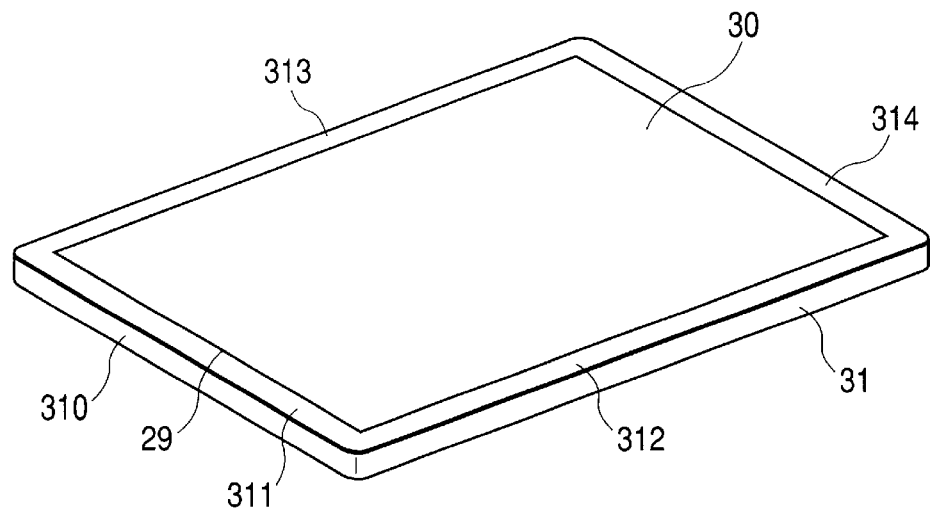
FIG. 7 is a perspective view of a printed ID card on the surface of which lamination is completed by the lamination system according to the present invention.

FIG. 3 shows the cut laminate film 30. As shown, the continuous laminate film 24 is cut along the cutting line 28 at a distance L from the leading edge 29. A cut edge 26 becomes a new leading edge of the continuous laminate film 24 to be cut next. The length L is adjusted by fine adjustment of relative distance between the film detection sensor 11 and the cutter 7, or by transferring the continuous laminate film 24 a little after the leading edge 29 is detected by the film detection sensor 11. The cut laminate film 30 is laid on the printed ID card 31 at the point of convergence at which the film transfer path 240 and the card transfer path 250 converge, then the printed ID card 31 and the cut laminate film 30 are transferred to a place between the heat roller 20 and a platen roller 21 composing a thermocompression bonding means provided at the downstream and laminated by thermocompression bonding. After that, the laminated ID card 31 is transferred through rollers 22 and 23 to be discharged from an outlet 252. The printed ID card 31 on which the lamination is completed is shown in FIG. 7. As shown in the drawing, the cut laminate film 30 is laminated on the printed ID card 31 with blank spaces 311 to 314 along four sides of the printed ID card 31. Accordingly, the cut laminate film 30 and the printed ID card 31 are transferred being controlled respectively to have a positional relation between them so that the desired blank spaces are provided on the ID card 31.

In thermocompression bonding process, the printed ID card 31 on which the cut laminate film 30 is laid is passed between the rollers 18 and 19, then passed between the heat roller 20 and the platen roller 21. When the printed ID card 31 and the cut laminate film 30 are passed between the heat roller 20 and platen roller 21, predetermined heat and pressure are applied to the printed ID card 31 and the cut laminate film 30. As a result, a heat adhesive layer of the cut laminate film 30 is activated and the cut laminate film 30 is laminated on the printed ID card 31 by thermocompression bonding. Same to the heat roller in the prior art, the heat roller 20 is made of an aluminum material and is treated to have a fluoro resin lining so that a melted material out of the printed ID card 31 does not stick on it. The platen roller 21 is made of a heat-resisting rubber material. In the central portion of the heat roller 20, a heater (not illustrated) is provided. The heater is controlled by a heater temperature control circuit provided in a controller, which will be referred to later, so that the temperature at the surface of the heat roller 20 is optimum for the lamination. Thus, the laminate film 30 is certainly laminated on the surface of the ID card 31.

In such thermocompression bonding process, the ID card 31 tends to be bent concave toward the heat roller 20, since the ID card 31 is passed between the heat roller 20 and the platen roller 21 that differ in temperature and in rigidity. In order to straighten the bent ID card 31, a card straightening means comprising rollers 22 and 23 supported on an adjustment plate 220 is provided at the downstream of the heat roller 20 and the platen roller 21. While the laminated ID card 31 is being passed between these rollers, the adjustment plate is tilted so that the rollers 22 and 23 pivot in the direction indicated by an arrow R around an axis of rotation (not illustrated) of the roller 23, and that the transfer path is tilted. Accordingly, the reverse bend to the concave bend is applied to the laminated ID card between the heat roller and the card straightening means, to straighten the bent ID card.

In the first embodiment of the lamination system 1 according to the present invention, a spring up suppression means for suppressing a spring up of the trailing edge of the ID card 31 is provided between the thermocompression bonding means and the card straightening means. The spring up suppression means comprises two pinch rollers 221 opposing to the card transfer path 250, and of which axes are aligned in the direction crossing transversely the card transfer path 250. The pinch rollers 221 have external diameters smaller than those of the heat roller 20, the platen roller 21 and rollers 22 and 23. The pinch rollers 221 are supported to be freely rotatable by a support axis (not illustrated), and provided closely near to the thermocompression bonding means with the circumference closely opposing to the card transfer path 250. Additionally, the two pinch rollers 221 may be replaced by a pinch roller having a length approximately equal to a width W1 of the ID card 31.

When the trailing edge of the ID card 31 leaves the heat roller 20 and the platen roller 21, the trailing edge tends to spring up toward the heat roller 20 due to a bending moment applied by the card straightening means. Due to the existence of the pinch roller 221, however, the spring up of the trailing edge of the ID card 31 is suppressed, and the ID card 31 is transferred along the card transfer path 250 with the trailing edge kept on the card transfer path 250. Accordingly, the trailing edge of the ID card 31 is not pressed to the heat roller 20. Further, since the straightening force for the bent ID card 31 is maintained by pinch roller 221, even in a process in which the heat applied by the heat roller 20 is being cooled after the trailing edge of the ID card 31 is released from the heat roller 20 and the platen roller 21, the straightening of the bent ID card 31 after lamination is improved.

Figure 5:
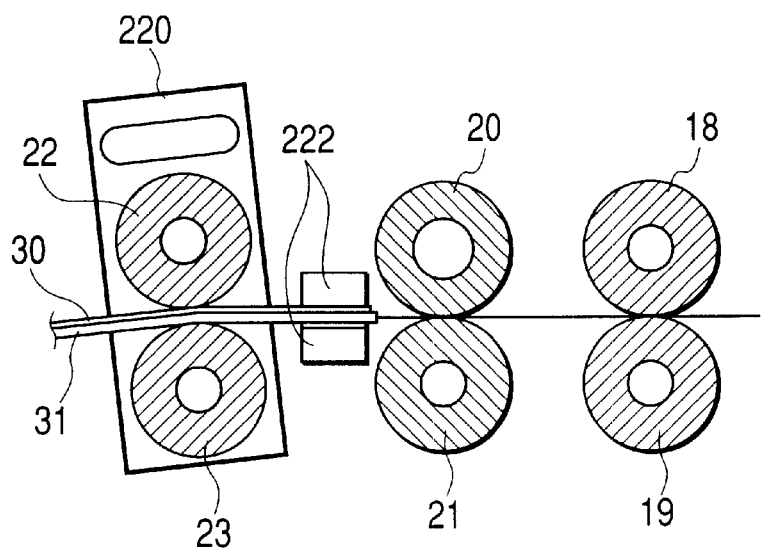
FIG. 5 is a schematic front view of a spring up suppression means in the second embodiment of the lamination system according to the present invention.

FIG. 5 shows another spring up suppression means in the second embodiment of the lamination system according to the present invention. In this embodiment, a card guide member 222 is used as the spring up suppression means, in place of the pinch roller(s) 221 in the first embodiment. The card guide member 222 comprises two plates parallel with each other and having a gap between them that enables the passage of the laminated ID card 31 and that can suppress the spring up of the trailing edge of the laminated ID card 31. At a side end or both side ends of the card guide member 222, the two plates may be connected with each other by a connecting member(s). The card guide member 222 is provided along the card transfer path 250 so that the center line of the gap approximately corresponds to the card transfer path 250. Thickness of the gap is made to be approximately equal to or slightly larger than the thickness of the ID card 31.

Additionally, the guide member may be composed of two pairs of plates, each pair of which covers each side edge of the ID card 31 respectively, and provided along each side of the card transfer path 250.

By the guide member thus composed, the spring up of the trailing edge of the ID card 31 is suppressed, similarly to the first embodiment in which the pinch roller is used, and the ID card 31 is transferred along the card transfer path 250 with the trailing edge kept on the card transfer path 250. Accordingly, the same effect to that of the spring up suppression means comprising pinch roller(s) 221 in the first embodiment can be achieved.

Figure 6:
FIG. 6 is a side view of a laminated ID card.

FIG. 6 shows a side view of the laminated ID card 31. In the drawing, solid lines show the ID card 31 laminated by the lamination system 1 according to the present invention, whereas dotted limes show an ID card laminated by a lamination system of the prior art. As shown in the drawing, in case that the spring up suppression means is not provided, a laminated ID card is not sufficiently straightened, particularly in its portion near to a trailing edge 321. In the lamination system 1 according to the present invention, the laminated ID card 31 approximately plane is obtained. Further, by the lamination system 1 according to the present invention, the laminated ID card 31 of high quality, such as shown in FIG. 7, to which no melted material out of the printed ID card sticks is obtained.

Figure 8:
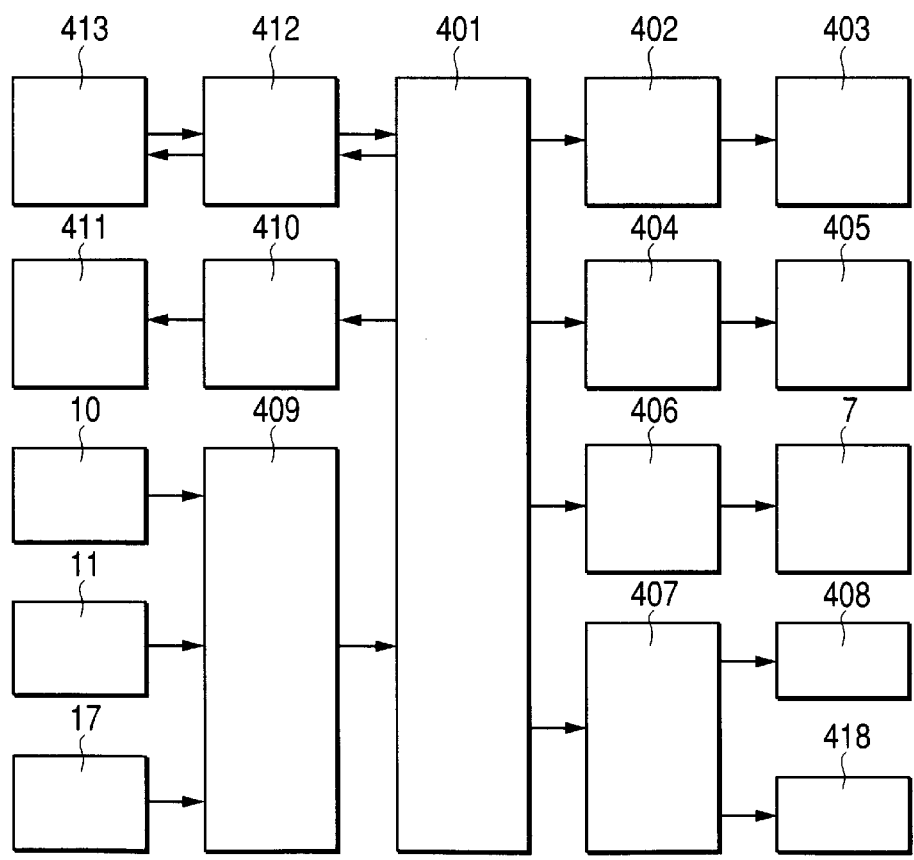
FIG. 8 is a block diagram of a controller adopted in the lamination system according to the present invention.

Now, a controller used in the lamination system 1 according to the present invention is explained. FIG. 8 shows a block diagram of a controller mounted in the lamination system 1. The controller comprises; a central signal processing unit 401 composed of micro processors and the like, a card transfer control circuit 402, a card transfer motor 403, a laminate film transfer control circuit 404, a laminate film transfer motor 405, a cutter drive circuit 406, a clutch drive circuit 407, a laminate load electric clutch 408, a laminate feed electric clutch 418, a sensor signal processing circuit 409, a heater temperature control circuit 410, a heater 411, a control panel signal processing circuit 412 and a control panel 413.

The laminate load electric clutch 408 is used to connect or disconnect driving force of the laminate film transfer motor 405 to the roller 4. The laminate feed electric clutch 418 is used to connect or disconnect driving force of the laminate film transfer motor 405 to the roller 8. The rollers 5 and 6 are connected to the roller 4 through gears provided with respective shafts (not illustrated). Also, The rollers 8 and 9 are connected with each other through gears provided with respective shafts (not illustrated). The rollers 12 to 15 provided along the card transfer path 250 are driven by the drive force of the card transfer motor 403 and transfer the ID card 31.

Operation of the controller with regard to the lamination system 1 according to the present invention is as follows.

Figure 4:
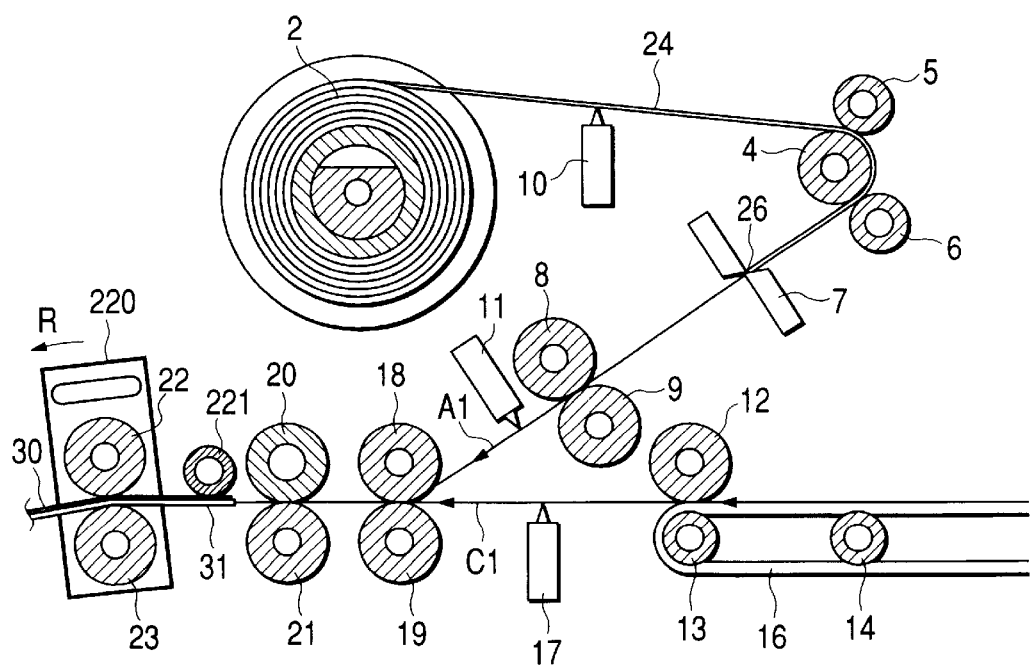
FIG. 4 is a schematic front view of the wasteless type lamination system according to the present invention in which a laminated ID card has passed a thermocompression means.

First, the signal processing unit 401 instructs, through the laminate film transfer control circuit 404, the laminate film transfer motor 405 to rotate to draw out the continuous laminate film 24 from the supply roll 2. At the same time, the laminate load electric clutch 408 and the laminate feed electric clutch 418 are activated, the roller 4 and the roller 8 are rotated being synchronized with each other, and the laminate film 24 is transferred until the leading edge 29 reaches a responsive position of the film detection sensor 11. When the leading edge 29 of the laminate film 24 reaches the responsive position of the film detection sensor 11, the output of the film detection sensor 11 becomes activated. The activated output signal is transmitted through the sensor signal processing circuit 409 into the signal processing unit 401. The signal processing unit 401 stores temporarily the point at which the activated signal is transmitted as a position information in an internal memory. The position information is used later as a reference point for transmitting the cut laminate film 30 into the downstream synchronized with the transfer of the printed ID card 31. At the same time, the transfer of the laminate film 24 is stopped and the cutter 7 is driven through the cutter drive circuit 406 to cut the laminate film 24. After the laminate film 24 is cut, the signal processing unit 401 instructs the laminate film transfer motor 405 to rotate to transfer the cut laminate film 30 in the direction indicated by an arrow A1 in FIG. 4.

On the other hand, the output signal of the card edge detection sensor 17 that detects the leading edge of the printed ID card 31 is transmitted to the signal processing unit 401 through the sensor signal processing circuit 409. The point at which the leading edge of the printed ID card 31 is detected is temporarily stored as the position information in the internal memory of the signal processing unit 401 and referred to as the reference point for the succeeding control of the transfer of the printed ID card 31. Thus, the printed ID card 31 is transferred along the card transfer path 250 shown in the direction indicated by an arrow C1 in FIG. 4. The amount of the transfer of the printed ID card 31 is controlled by the roller 12 connected to the card transfer motor 403 that is controlled by a command pulse signal.

The cut laminate film 30 is further transferred being synchronized with the printed ID card 31 along the laminate film transfer path 240, and laid on the printed ID card 31 at the point of convergence of the film transfer path 240 and the card transfer path 250. Then the cut laminate film 30 and the printed ID card 31 are transferred to the place between the heat roller 20 and the platen roller 21 provided at the downstream. In the central portion of the heat roller 20, the heater 411 is provided. Temperature of the heater 411 is controlled by the heater temperature control circuit 410 to make the temperature at the surface of the heat roller 20 proper for the lamination. Thus, the cut laminate film 30 is certainly laminated on the surface of the printed ID card 31 by thermocompression bonding. The control of the transfer of the laminated ID card 31 is successively continued until the laminated ID card 31 is discharged from the outlet 252 of the lamination system 1.

In the above explanation of the present invention, the explanation is made for a case in which the card transfer motor 403 and the laminate film transfer motor 405 are provided separately as the drive sources of the lamination system. However, it is quite apparent that the same effects of the present invention can be achieved using a single motor connected to a plurality of electric clutches to connect/disconnect drive force to the respective rollers. Also, although the explanation is made for a case in which the reflective type optical sensors are used as the sensors for detecting such as the laminate film and the printed ID card, it is also quite apparent that the same effects of the present invention can be achieved using sensors of another types. Additionally, PVC are being generally used as the materials of the ID card to be laminated. The lamination system of the present invention can be used for a card made of a composite material such as PET-G, and further, the lamination system of the present invention can be used for any card regardless of the material of which the card is made. Further, the object to be laminated by the lamination system 1 of the present invention is not limited to ID card. The lamination system 1 of the present invention is applicable to a lamination of a continuous film, being successively cut, on a substrate in the form other than ID card by modifying accordingly.

In the lamination system 1 according to the present invention as explained above, since the spring up suppression means comprising the pinch roller 221 or the guide member 222, for suppressing spring up of the trailing edge of the laminated ID card 31 leaving the thermocompression bonding means is provided between the thermocompression bonding means and the card straightening means, the trailing edge of the laminated ID card 31 is not pressed to the heat roller 20 when the laminated ID card 31 leaves the thermocompression bonding means. Accordingly, the trailing edge of the ID card 31 is prevented from melting, no melted material sticks to the surface of the heat roller 20, and thus the surface of a successive ID card to be laminated next is prevented from being spoiled by a melted material. Further, since the straightening force for the bent ID card 31 is maintained also in the process in which the heat applied by the heat roller 20 is being cooled after the trailing edge of the ID card 31 is released from the thermocompression bonding means, the straightening of the bent ID card 31 after lamination is improved.

What is claimed is:

1. A lamination system comprising:

a film transfer means for transferring along a first transfer path a continuous film with a heat adhesive layer on a surface and drawn out from a supply roll, a cutting means provided along said first transfer path for cutting said film in a predetermined length;

a card transfer means for transferring an ID card along a second transfer path that converges with said first transfer path at a predetermined point of conversion;

a thermocompression bonding means for laminating said film cut in said predetermined length and laid on a surface of said ID card transferred to said ID card at the downstream of said point of conversion; and a card straightening means provided at the downstream of said thermocompression bonding means for straightening said ID card laminated and bent during said thermocompression bonding, wherein a spring up suppression means for suppressing a spring up of a trailing edge of said laminated ID card leaving said thermocompression bonding means is provided between said thermocompression bonding means and said card straightening means.

2. The lamination system according to claim 1, wherein said spring up suppression means comprises a rotary element freely rotative.

3. The lamination system according to claim 1, wherein said spring up suppression means comprises a card guide member having a gap that enables the passage of said laminated ID card and the suppression of said spring up of said trailing edge of said laminated ID card.

* * * * *